B. STEPHEN & D. R. JAMES.
AUTOMOBILE LAMP CONTROL.
APPLICATION FILED DEC. 13, 1912.

1,077,172.

Patented Oct. 28, 1913.

Witnesses
William Smith
R. M. Smith

Inventors
B. Stephen.
D. R. James.

By Victor J. Evans
Attorney

UNITED STATES PATENT OFFICE.

BENJAMIN STEPHEN AND D. REED JAMES, OF AMBIA, INDIANA.

AUTOMOBILE-LAMP CONTROL.

1,077,172.  Specification of Letters Patent.  Patented Oct. 28, 1913.

Application filed December 13, 1912. Serial No. 736,617.

*To all whom it may concern:*

Be it known that we, BENJAMIN STEPHEN and D. REED JAMES, citizens of the United States, residing at Ambia, in the county of Benton and State of Indiana, have invented new and useful Improvements in Automobile-Lamp Controls, of which the following is a specification.

This invention relates to automobile lamp controls, the object in view being to provide simple and reliable mechanism which may be readily applied to automobiles already in use, for causing the head lamps to swing proportionately to the front wheels of the machine, thereby directing the rays of light in the course to be immediately followed by the machine, in accordance with the angle of the front wheels.

A further object of the invention is to provide means for lubricating the base of the lamp post so that it will turn with a minimum amount of friction thereby reducing the energy required to a minimum.

With the above and other objects in view, the invention consists in the construction, combination and arrangement of parts, as will be hereinafter fully described, illustrated in the accompanying drawing and pointed out in the claim hereunto appended.

Figure 1:
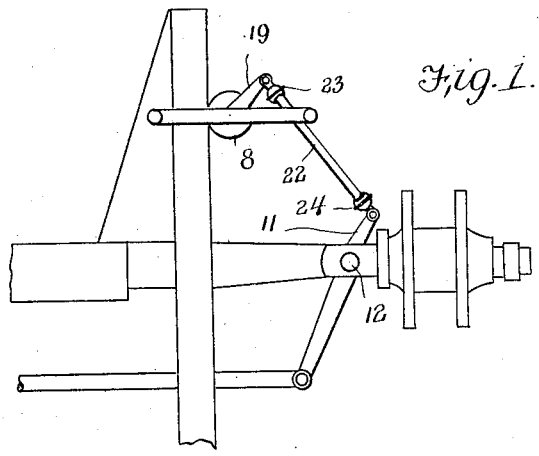
Figure 3:
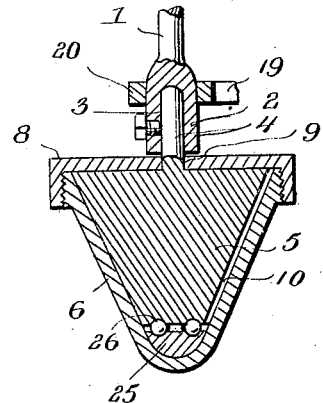
Figure 2:
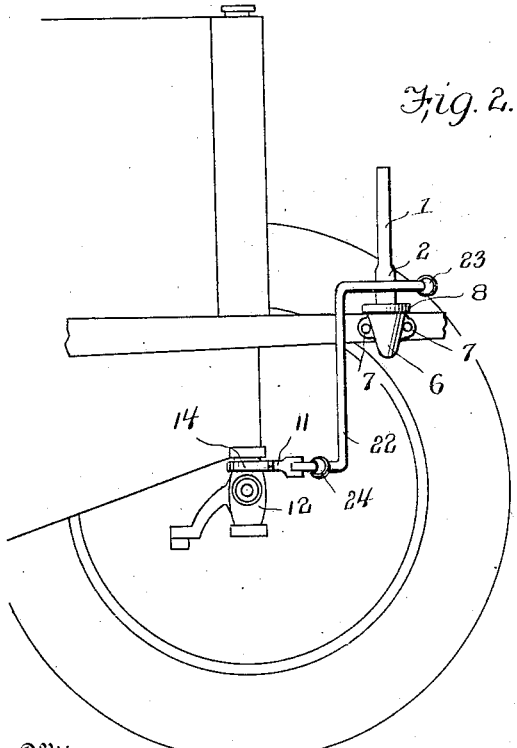
Figure 4:
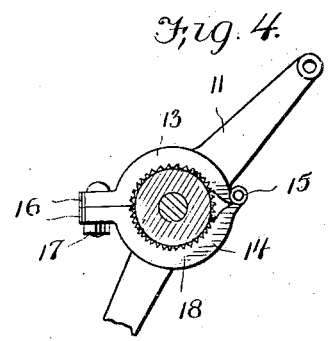
Figure 5:
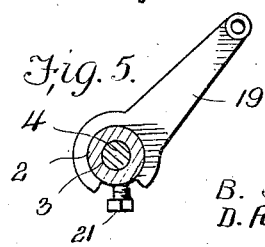

In the accompanying drawing: Figure 1 is a plan view of a sufficient portion of the running gear of an automobile to illustrate the application of the present invention thereto. Fig. 2 is a side elevation of the same. Fig. 3 is a detail vertical section through the lamp post bearing. Fig. 4 is a plan view of the lamp throwing arm and its clamping extension. Fig. 5 is a similar view of the lamp post arm.

Referring to the drawing, 1 designates the usual lamp post or bracket upon which one of the head lamps is mounted.

In carrying out this invention, the lower end of the post 1 is enlarged as shown at 2 and provided with a socket 3 extending upward from the bottom thereof adapted to receive a post or stud 4 on an inverted cone bearing 5 which is mounted in a correspondingly shaped inverted conical socket 6 secured to the chassis of the machine by providing said socket with laterally projecting ears 7 bolted, screwed or otherwise fastened to the chassis, as indicated in Fig. 2.

The upper end of the socket 6 is externally threaded to receive an internally threaded flanged cap 8 which is formed with a central hole 9 adapted to permit the stud 4 to pass through the same in placing the cap in position on the socket 6. Lubricating oil or grease may be placed in the socket or cup 6 so as to properly lubricate the base 5 where it rests against the inner wall of the socket 6 and in order to distribute said lubricant, the base 5 may be provided with one or more grooves 10 to enable said lubricant to reach all parts of the bearing. The cap 8 serves both as a retainer for the base 5 and the grease or lubricating material.

11 designates a lamp throwing or turning arm of any suitable length, the same being adapted to be fastened to the ordinary steering knuckle 12 of the machine by means of a sectional annular clamp, as shown in Fig. 4, said clamp having one semi-circular section 13 thereby formed integrally with the base of the arm 11 while the other section 14 of the clamp is hinged to the stationary section at the point 15. The sections 13 and 14 are also provided with ears 16 through which a clamping bolt 17 is passed, and by preference the inner surfaces of the sections 13 and 14 are serrated or roughened, as shown at 18 to enable them to obtain a firm, positive hold on the knuckle 12. The arm thus constructed is adapted to be placed on and secured to the knuckle of any automobile at present in use so that the attachment of the device requires no alterations whatever in any part of the machine.

A lamp arm 19 is secured to the lamp post 1 and for that purpose is provided with a sleeve 20. Its inner end is of a size adapted to fit over the enlarged portion 2 of the lamp post and to be held in place thereon by means of a set screw 21.

Interposed between the arms 11 and 19 is a connecting rod 22 having a ball and socket connection at 23 with the arm 19 to another ball and socket connection at 24 with the arm 11, as shown in Fig. 1.

It will now be seen that with all of the parts combined in the manner illustrated in Figs. 1 and 2, any angle taken by the arm 11 when the steering knuckle is turned will impart a corresponding angle to the arm 19 and, therefore, the lamp which is rigidly mounted on the post 1 will be swung correspondingly with the front wheels of the machine so as to throw the rays of light in the direction to be followed by the machine.

The lower portion 25 of the cone bearing 5 may be made separately from the upper portion or section thereof as shown in Fig. 3 and the adjacent faces of the two sections may be provided with annular ball races to receive a circular series of anti-friction balls 26 thereby forming a ball bearing support for the upper section on the lower section of the cone. This, however, does not interfere with the oscillation of the lower section 25 of the cone in case one of more of the balls 26 should become broken.

As shown in Fig. 2, the connecting rod 22 is offset or bent as shown so as to allow for the difference in height of the arms 11 and 19 while the ball and socket joints take care of any variation in the distance between said arms in a vertical direction due to the action of the springs of the machine.

We claim:—

In an automobile lamp control, a lamp throwing arm, means for attaching said arm to the steering knuckle of the machine, a lamp post having a socket in the bottom thereof, an inverted cone bearing at the bottom of said post having an upwardly projecting stem which fits into the socket of the post and to which said post is fastened, an arm on said post, an inverted conical cup adapted to be fastened to the machine frame to receive said cone bearing and lubricant, a flange retaining cap surrounding the lamp post and screwing on top of the cup, and a connecting rod interposed between said arms.

In testimony whereof we affix our signatures in presence of two witnesses.

BENJAMIN STEPHEN.
D. REED JAMES.

Witnesses:
JOHN C. LACY,
W. F. MORGAN.